United States Patent [19]

Winterlik

[11] Patent Number: 5,090,293
[45] Date of Patent: Feb. 25, 1992

[54] HYDRAULIC BOOSTER WITH REACTION FORCE IMPARTING SURFACE OF EASILY MODIFIABLE FORM

[75] Inventor: Otmar Winterlik, Mainz-Weisenau, Fed. Rep. of Germany

[73] Assignee: Alfred Teves GmbH, Frankfurt am Main, Fed. Rep. of Germany

[21] Appl. No.: 518,906

[22] Filed: May 4, 1990

[30] Foreign Application Priority Data

May 16, 1989 [DE] Fed. Rep. of Germany ....... 3915877

[51] Int. Cl.$^5$ .......................... F15B 9/10; B60T 13/20
[52] U.S. Cl. .................... 91/373; 91/376 R; 60/547.1; 60/553; 60/556
[58] Field of Search ............... 91/369.1, 369.2, 370, 91/371, 372, 373, 376 R, 384; 60/547.1, 547.2, 547.5, 548, 549, 550, 551, 552, 553, 554, 555, 556, 589

[56] References Cited

U.S. PATENT DOCUMENTS

| | | | |
|---|---|---|---|
| 3,044,265 | 7/1962 | Schwartz et al. | 60/547.3 X |
| 3,782,781 | 1/1974 | Lewis | 60/547 B X |
| 3,877,227 | 4/1975 | Demido | 91/370 X |
| 3,879,948 | 4/1975 | Flory | 60/547.3 X |
| 4,467,700 | 8/1984 | Udono | 91/372 X |
| 4,741,161 | 5/1988 | Belart et al. | 60/547.1 |
| 4,750,406 | 6/1988 | Belart | 91/376 R |
| 4,884,492 | 12/1989 | Maehara | 91/370 |
| 4,901,626 | 2/1990 | Zingel et al. | 91/369.1 |
| 4,941,322 | 7/1990 | Nomura et al. | 60/547.1 |

FOREIGN PATENT DOCUMENTS

| | | |
|---|---|---|
| 3701018 | 7/1988 | Fed. Rep. of Germany . |
| 3725249 | 2/1989 | Fed. Rep. of Germany . |
| 3726525 | 2/1989 | Fed. Rep. of Germany . |
| 3821255 | 2/1989 | Fed. Rep. of Germany . |
| 3827507 | 3/1989 | Fed. Rep. of Germany . |
| 3736058 | 5/1989 | Fed. Rep. of Germany . |

Primary Examiner—Edward K. Look
Assistant Examiner—John Ryznic
Attorney, Agent, or Firm—Robert P. Seitter; J. Gordon Lewis

[57] ABSTRACT

A hydraulic booster for slip-controlled brake systems, including a booster piston (1) arranged in a booster housing (11) and confining a booster chamber (4). A braking pressure control valve is provided whose control part (12) is actuatable by a lever mechanism (13) as a function of the piston of the control part (12). An actuating piston (2) is displaceably guided in the booster piston (1) and is positioned by way of a push rod which cooperates with the lever mechanism (13). To provide a hydraulic booster to realize boosting factors of any desired size, both of constructional and strength-minimizing nature, an annular surface (24) is formed the stepped actuating piston (2), on the side of the push rod (22) and is larger than the total area of any opposing annular surfaces, subject to the booster chamber pressure to create a net force acting to oppose the push rod force and allow setting of the boosting factor by adjustment of the area of the annular surface.

2 Claims, 1 Drawing Sheet

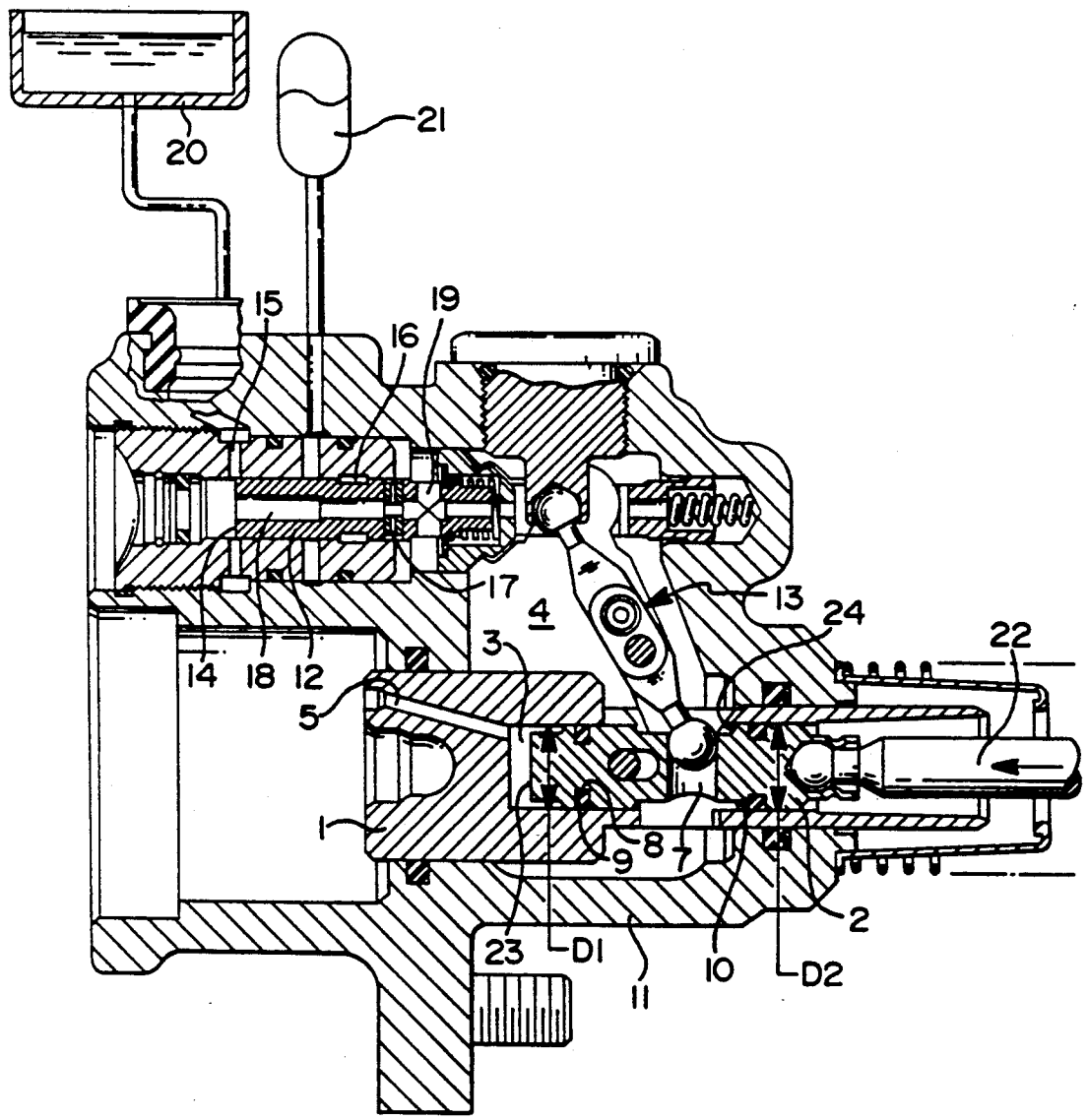

HYDRAULIC BOOSTER WITH REACTION FORCE IMPARTING SURFACE OF EASILY MODIFIABLE FORM

BACKGROUND OF THE INVENTION

The present invention relates to a hydraulic booster for slip-controlled brake systems having a booster piston in a booster chamber wherein the hydraulic booster accommodates boosting factors of any desired size both in construction and to minimize strength requirements.

German Published Patent Application (DE-OS) No. 37 01 018 describes a hydraulic booster in combination with a slip-controlled brake system of the type to which the present invention is directed. The hydraulic booster described therein receives a fastening element screwed into the booster housing and communicating with the lever mechanism so that, upon actuation of the push rod, the lever mechanism first end piece is guided in the actuating piston and features a ball-head design which performs a swivelling motion that is synchronous in respect of the stroke of the actuating piston. This is performed around the rigid point of support in the lever-receiving part of the screw-thread-design fastening element. The lever segment hinged to the shaft part of the lever mechanism is guided with its end faces in the opening of the prolonged, sleeve-like extension of the booster piston and in an opening of the actuating piston. Upon actuation of the push rod, the lever mechanism carries out a swivelling motion which results in a defined stroke of the braking pressure control valve displaceably supported in the booster housing. Accumulator pressure thereby is supplied into the booster chamber by way of the braking pressure control valve so that a hydraulic booster of the braking pressure is effective under the action of the accumulator pressure acting on the front face of the booster piston. At the same time, the actuating piston also is acted upon by the boosting pressure so that, as a function of the constructional dimensioning of the pressure-applied front face, a hydraulic force of a corresponding value acts on the actuating piston in the direction of the push rod.

Because of the construction and strength requirements with regard to the cross-section of the lever-receiving part in the opening of the actuating piston, it essentially is impossible to realize hydraulic boosting operations of any desired extent in the described booster so that, in the hydraulic boosters used at present, for example, a boosting factor of i=6.4 is achievable at the maximum with a one-inch tandem master cylinder connected downstream.

Further, in the known hydraulic boosters of this type which are in use today, because of the dynamic flow-in principle preferably used in the rear wheel brakes, the booster piston surface which by way of the booster chamber acts in the direction of the tandem master cylinder is coordinated with the effective surface of the tandem master cylinder and, consequently, does not permit any variations in the dimensioning of the components without resulting disadvantageous effects on the braking force distribution.

Accordingly, it is an object of the present invention to improve a hydraulic booster of the type referred to while avoiding the aforementioned disadvantages and while maintaining the operational reliability, so that boosting factors of any size may be realized without having to tolerate the abovementioned disadvantageous strength-minimizing influences on the actuating device of the booster.

SUMMARY OF THE INVENTION

The present invention is achieved by providing an annular surface on a stepped form of the actuating piston, with the area of the surface subjected to booster chamber pressure, thus creating a hydraulic force acting against the push rod. The actuating piston cavity in the booster piston is vented so that only the annular area of the booster piston around the actuating piston is subject to booster pressure.

As the boosting factor is a ratio between annular the booster piston surface around the applied by the accumulator pressure in the direction of the tandem master cylinder and the actuating piston annular surface applied by the boosting pressure in the direction of the push rod, it is possible to increase the factor at will by selecting the area of the annular surface acting under booster pressure to create the net force in the direction of the push rod. In order to product this result, it is necessary that the cavity in the booster piston at the end of the actuating piston opposite the push rod pressureless as by being connected to the storage reservoir.

In order to ensure that the actuating piston end slidingly guided within the booster piston is well sealed a preferred embodiment of the present invention provides a groove radially surrounding the actuating piston and receiving a seal, preferably a rubber profile ring or a polyamide seal of square cross-section.

So as to enable the actuating piston to move in the opening of the booster piston with a minimum of friction the present invention provides arranging the actuating piston in a collar-type design on both sides thereof at an axial distance with respect to the circumferential groove so that the sliding surface guidance can be limited to a minimum.

BRIEF DESCRIPTION OF THE DRAWING

Further characteristics, advantages and applications will become evident from the following detailed description of one embodiment when taken in conjunction with the accompanying drawing wherein the single figure shows a longitudinal section through an advantageous embodiment of the inventive booster.

DETAILED DESCRIPTION

FIG. 1 illustrates an embodiment of the hydraulic booster in accordance with the present invention shown in longitudinal section. In correspondence therewith, a booster piston 1 axially displaceable as well as radially guided in a booster housing 11 accommodates the cylindrical actuating piston 2 so that the same is displaceably guided with a radially surrounding seal 9 in a coaxial opening of the booster piston 1. A cavity 3 is provided between the seal of the actuating piston 2 and the channel arranged in the booster piston 1. By way of the channel 5 worked into the booster piston 1, cavity 3 communicates hydraulically with the storage reservoir 20 through radial passage 15 which is under atmospheric pressure.

In the operational position of release of the booster the booster chamber 4 communicates with the storage reservoir 20 by way of the control edge 14 formed on t.-he front face on the control part 12 of the braking pressure control valve. Upon actuation of the pedal, the control part 12 guided in the braking pressure control valve will be displaced in the direction of the boosting action by way of the lever mechanism 13 and at first will close the radial passage 15 in the booster housing 11 by means of the front-side control edge 14, which radial passage 15 is under the reservoir pressure. Upon a release of the radial control opening 17 in the control part 12 by way of the annular chamber 16 of the braking pressure control valve, the pressure accumulator medium will enter the longitudinal bore 18 of the control part 12 and, by way of a connecting channel 19 being radially bent off, the booster chamber 4. The hydraulic, auxiliary-energy-assisted displacement of the booster piston 1 will come about in the direction of the actuation under the action of the relatively high accumulator pressure acting on the front face of the booster piston 1. A first front face 23 is provided on the side of actuating piston 2 which is remote from a push rod 22 and is hydraulically acted upon by the fluid of storage reservoir 20. A second front face 24 of piston 2 adjacent push rod 22 is acted upon by the booster pressure of pressure medium source 21. One end of rotating lever mechanism 13 is received within an opening 7 in actuating piston 2. In contrast to conventional boosters, the force acting in the direction of the piston rod is not determined by the boosting pressure on the entire cross-section of the actuating piston 2. Instead, because of the insertion of the seal 9 in a circumferential groove 8 between the booster piston 1 and the actuating piston 2 as well as because of the actuating piston 2 provided as a stepped piston provided with a shoulder, (i.e., $D_1$ is smaller than $D_2$) only the surface area of the two annular surfaces of the booster piston 1 and actuating piston 2 respectively will be subject to pressure, creating net forces acting on the booster piston 1 and activating piston 2 in the direction of the piston rod respectively. As the boosting factor is a ratio between the booster piston surface subject to the accumulator pressure in the direction of the tandem master cylinder and the actuating piston surface subject to the boosting pressure in the direction of the piston rod it is possible to increase the boosting factor without limitation by selecting any desired net difference small surface area on the actuating piston 2. The surface thus has a hydraulic pressure in the direction of the push rod 22. This is achieved in an advantageous and simple manner by means of the shoulder 10 of the actuating piston 2. To this end, the cavity 3 between the actuating piston 2 and the booster piston 1 communicates in a pressureless manner with the storage reservoir 20. By analogy with the known hydraulic boosters the supply to one brake circuit is in accordance with the dynamic flow-in principle such as used in other types of brake systems. As the pressure for braking the rear axle is controlled by way of the booster chamber 4, the hydraulically applied booster piston surface acting in the direction of the tandem master cylinder should be coordinated with the effective surface of the tandem master cylinder. In the actuating and boosting device in accordance with the present invention the desired boosting factors can be realized without having to tolerate disadvantageous limitations influencing constructional strength and braking force.

What is claimed is:

1. A hydraulic booster for increasing a force applied by a pedal operated push rod to a master cylinder in a slip-controlled brake system including a booster housing having walls defining a booster chamber therein, a booster piston movably mounted in said booster housing, said booster piston having one end engagable with a master cylinder extending out through one of said booster housing walls from within said booster chamber, and a smaller diameter sleeve extension on said booster piston extending out from said booster chamber through another booster housing wall so that the booster piston has an area urged towards said one end by pressure in said booster chamber, a braking pressure control valve having a movable control part, means for generating an actuating force for actuating said control part including a lever mechanism, a storage reservoir of hydraulic fluid at atmospheric pressure, a source of pressurized hydraulic fluid, means for establishing a controlled communication between said booster chamber and said storage reservoir or said source of pressurized hydraulic fluid as a function of the position of said control part, an actuating piston displaceably guided in a bore in said booster piston and having one end positionable by engagement with said push rod, said actuating piston cooperating with said lever mechanism to position said control part in correspondence with the position of said actuating piston, the other end of said actuating piston remote from said push rod received in a cavity in said booster piston, said one end sealed to said booster piston bore, means causing said cavity to be subject to atmospheric pressure, said actuating piston formed with an intermediate section coupled to said lever mechanism to cause a movement of said control part so as to cause an increase in said booster chamber pressure as said actuating piston moves in the direction of said cavity and a decrease in chamber pressure as said actuating piston moves in the direction of said push rod, said actuating piston intermediate section passing through an opening in said booster piston sleeve extension to be exposed to pressure in said booster chamber, said actuating piston being of stepped construction to form an annular surface formed on said intermediate section to be subject to booster chamber pressure and facing said cavity, said booster chamber pressure acting on said annular surface to produce a net force on said actuating piston acting to oppose the force of said piston rod on said actuation piston, whereby a ratio between the force of said piston rod and a force of said booster piston is varied in correspondence with the area of said annular surface in proportion to the area of said booster piston acted on by said booster chamber pressure.

2. A hydraulic booster as claimed in claim 1, wherein said cavity, is hydraulically communicated to said storage reservoir by means of a channel extending through said booster piston.

* * * * *